United States Patent [19]
Oono

[11] Patent Number: 5,793,735
[45] Date of Patent: Aug. 11, 1998

[54] WAVEFRONT ABERRATION COMPENSATION IN AN OPTICAL DATA RECORDING AND REPRODUCING APPARATUS WITH CRYSTAL LIQUID MATRIX

[75] Inventor: Masahiro Oono, Tokyo, Japan

[73] Assignee: Asahi Kogaku Kogyo Kabushiki Kaisha, Tokyo, Japan

[21] Appl. No.: 591,299

[22] Filed: Jan. 25, 1996

[30] Foreign Application Priority Data

Feb. 1, 1995 [JP] Japan ............... 7-036139

[51] Int. Cl.$^6$ .................. G11B 7/135; G11B 11/10
[52] U.S. Cl. .................. 369/116; 369/112; 369/44.23
[58] Field of Search .................. 369/116, 112, 369/44.23, 44.14; 250/201.5, 201.9; 359/75, 53; 356/121

[56] References Cited

U.S. PATENT DOCUMENTS

| | | | |
|---|---|---|---|
| 5,047,625 | 9/1991 | Iima et al. | 250/216 |
| 5,120,128 | 6/1992 | Ulich et al. | 356/121 |
| 5,157,459 | 10/1992 | Oono et al. | 356/359 |
| 5,223,970 | 6/1993 | Oono et al. | 359/223 |
| 5,317,144 | 5/1994 | Oono et al. | 369/44.23 |
| 5,416,757 | 5/1995 | Luecke et al. | 369/112 |
| 5,497,254 | 3/1996 | Amako et al. | 359/53 |

*Primary Examiner*—Georgia Y. Epps
*Assistant Examiner*—Kim-Kwok Chu
*Attorney, Agent, or Firm*—Greenblum & Bernstein P.L.C.

[57] ABSTRACT

A wavefront aberration compensating apparatus for an optical data recording and reproducing apparatus to correct a wavefront aberration of light emitted from a light source and converged onto a data recording medium through an image forming optical system includes a liquid crystal matrix. The matrix has several liquid crystal elements in a matrix arrangement, and is located in an optical path between the light source and the data recording medium. Each liquid crystal element can independently control a phase of light incident thereupon. The compensating apparatus also includes a liquid crystal controller which individually controls the liquid crystal elements to minimize the wavefront aberration of a beam spot converged onto the data recording medium. The invention is also directed to an optical data recording and reproducing apparatus having the wavefront aberration compensating apparatus incorporated therein.

24 Claims, 6 Drawing Sheets

WAVEFRONT ABERRATION COMPENSATION IN AN OPTICAL DATA RECORDING AND REPRODUCING APPARATUS WITH CRYSTAL LIQUID MATRIX

BACKGROUND OF THE INVENTION

1. Field of the Invention

The present invention relates to an apparatus for compensating for a wavefront aberration found in an optical data recording and reproducing apparatus, such as a magneto-optic disc apparatus.

2. Description of Related Art

In a magneto-optic disc apparatus, data magnetically recorded on a recording medium is reproduced by detecting a slight change in the state of the polarization of light due to the magnetic Kerr effect. Therefore, if a beam spot converged and formed on the magneto-optic disc contains a wavefront aberration, the S/N (signal-to-noise ratio) of the reproduced signals deteriorates.

To prevent static wavefront aberrations, such as residual wavefront aberrations, remaining in an optical system, it is necessary to strictly control the precision of each optical element in both manufacture and assembly. However, such high precision control requires a long time in both production and assembly of the optical elements, as well as increases the cost of production and assembly of the apparatus.

SUMMARY OF THE INVENTION

It is an object of the present invention to provide a wavefront aberration compensating apparatus in which little or no wavefront aberration is produced in an optical data recording and reproducing apparatus, and reduces the strict precision control of the optical elements during manufacture and assembly.

To achieve the object mentioned above, according to the present invention, there is provided a wavefront aberration compensating apparatus for an optical data recording and reproducing apparatus. This wavefront aberration compensating apparatus corrects a wavefront aberration of light emitted from a light source and converged onto a data recording medium through an image forming optical system. The wavefront aberration compensating apparatus includes a liquid crystal matrix (LC matrix) having several liquid crystal elements (LC elements) arranged in a two-dimensional matrix, and located in an optical path between the light source and the data recording medium. Each LC element is capable of independently controlling a phase of light incident thereupon. A liquid crystal control device (LC control device) individually controls the LC elements to minimize the wavefront aberration of a beam spot converged onto the data recording medium. The LC control device independently controls a voltage applied to the LC elements to control the refractive index of each LC element.

Preferably, a storage devices stores control data, measured in advance, to correct the wavefront aberration of the optical data recording and reproducing apparatus. The LC control device controls the LC elements in accordance with this control data. The storage device also stores a set of control data for the LC elements to correct the wavefront aberration which is inherent in the image forming optical system. In addition, the storage device stores several sets of data for the LC elements, including data representing at least one factor which varies when the apparatus is used. For example, temperature or data regarding different types of recording mediums to be used, and control data to correct the wavefront aberration due to changes in this variable factor are stored. The LC control device reads control data from the storage device corresponding to the state of the factor detected during use of the apparatus, and accordingly controls the LC elements.

Preferably the wavefront aberration compensating apparatus also includes an optical detector which detects the light reflected from the recording medium. The LC control device controls a voltage applied to the LC elements to minimize deterioration in the signals detected by the optical detector.

An external measuring apparatus is also provided to provide control data to the wavefront aberration compensating apparatus. An interferometer receives light emitted from the image forming optical system and measures the wavefront aberration of a beam spot formed on the recording medium, and obtains control data to control the LC elements in accordance with the wavefront aberration data measured by the interferometer. This control data is outputted to, and stored in, the data storage device.

According to another aspect of the present invention, an optical data recording and reproducing apparatus includes a light source, an image forming optical system which converges light emitted from the light source onto a data recording medium, and a signal detecting device for detecting light reflected by the data recording medium to pick up signals therefrom. A liquid crystal matrix (LC matrix) has several liquid crystal elements (LC elements) arranged in a two-dimensional matrix and located in an optical path between the light source and the data recording medium. Each LC element is capable of independently controlling a phase of light incident thereupon. A liquid crystal control device (LC control device) individually controls the LC elements to minimize the wavefront aberration of a beam spot converged onto the data recording medium.

Preferably, the LC control device controls the LC elements in accordance with an output from the signal detecting device.

A storage device stores control data, measured in advance, to correct the wavefront aberration. The LC control device controls the LC elements in accordance with this control data. The storage device also stores a set of control data to correct a wavefront aberration which is inherent to the image forming optical system. In addition, the storage device stores several sets of data for the LC elements, including data representing at least one factor which varies when the apparatus is in use; for example, temperature, and control data to correct the wavefront aberration due to this variation. The LC control device reads the control data corresponding to the state of the factor detected from the data storage device and accordingly controls the LC elements.

According to another aspect of the present invention, there is provided a wavefront aberration compensating method for an optical data recording and reproducing apparatus having a light source, a data recording medium, an image forming optical system for converging light emitted from the light source onto the data recording medium, and a liquid crystal matrix (LC matrix) having several liquid crystal elements (LC elements) arranged in a two-dimensional matrix and located in an optical path between the light source and the data recording medium, where each LC element independently controls a phase of light incident thereupon, and a liquid crystal control device (LC control means) for individually controlling the LC elements to minimize the wavefront aberration of a beam spot converged onto the data recording medium. The method sets an interferometer to receive the light emitted from the image forming optical system at a position where the recording medium is to be placed. The wavefront aberration of the light to be converged onto the recording medium is measured by the interferometer. Control data to control the LC elements in accordance with the wavefront aberration data is obtained. The LC elements are controlled by the control data to minimize wavefront aberration of the beam spot converged onto the recording medium. The method further comprises storing and reading the control data obtained by the control data obtaining step. The controlling step independently controls a voltage to be applied to the LC elements to control the refractive index of each LC element.

The present disclosure relates to subject matter contained in the Japanese Patent Application No. 7-36139 (filed on Feb. 1, 1995) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

The following discussion will be directed to four embodiments of an optical data recording and reproducing apparatus having a wavefront aberration compensating apparatus incorporated therein. In the following embodiments, a magneto-optic disc apparatus is used as an optical data recording and reproducing apparatus.

First Embodiment

Figure 1:
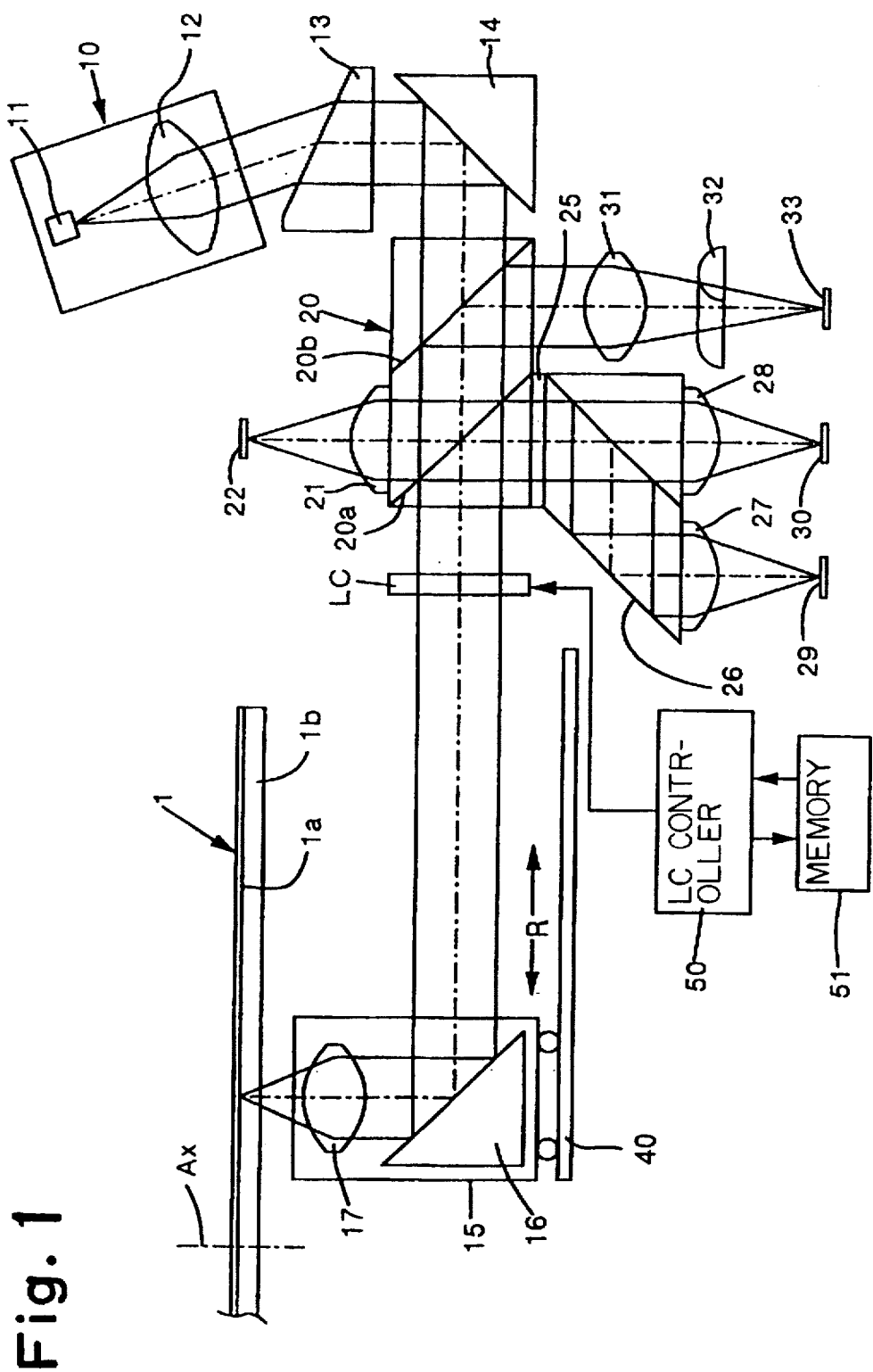
FIG. 1 is an explanatory view of an optical system of a magneto-optic disc apparatus having a wavefront aberration compensating apparatus incorporated therein, according to a first embodiment of the present invention.

FIG. 1 shows a first embodiment of an optical system of a magneto-optic disc apparatus having a wavefront aberration compensating apparatus. In this first embodiment, a matrix of liquid crystal elements or pixels (referred to as an LC matrix) is controlled so as to correct static wavefront aberration inherently produced in the optical system.

A magneto-optic disc 1 is used as a recording medium and includes a recording surface 1a on which magnetic data is recorded, and a transparent substrate 1b which covers and supports the recording surface 1a. The magneto-optic disc 1 is rotated about a rotation axis Ax by a spindle motor (not shown).

The optical system is provided with a light source portion 10 including a semiconductor laser 11 and a collimating lens 12 which collimates divergent light emitted from the laser 11. The laser light emitted from the light source 10 has an elliptical cross sectional, which is corrected to a circular cross sectional by an anamorphic prism 13. The laser light is then reflected by a reflecting mirror 14 toward a compound prism 20 having two half mirror surfaces, a first half mirror surface 20a and a second half mirror surface 20b. The light incident upon the compound prism 20 is partly reflected by the first half mirror surface 20a and, after passing through a condenser lens 21, is received by an APC (automatic phase control) sensor 22 which detects and controls the power of the semiconductor laser 11.

Figure 7:
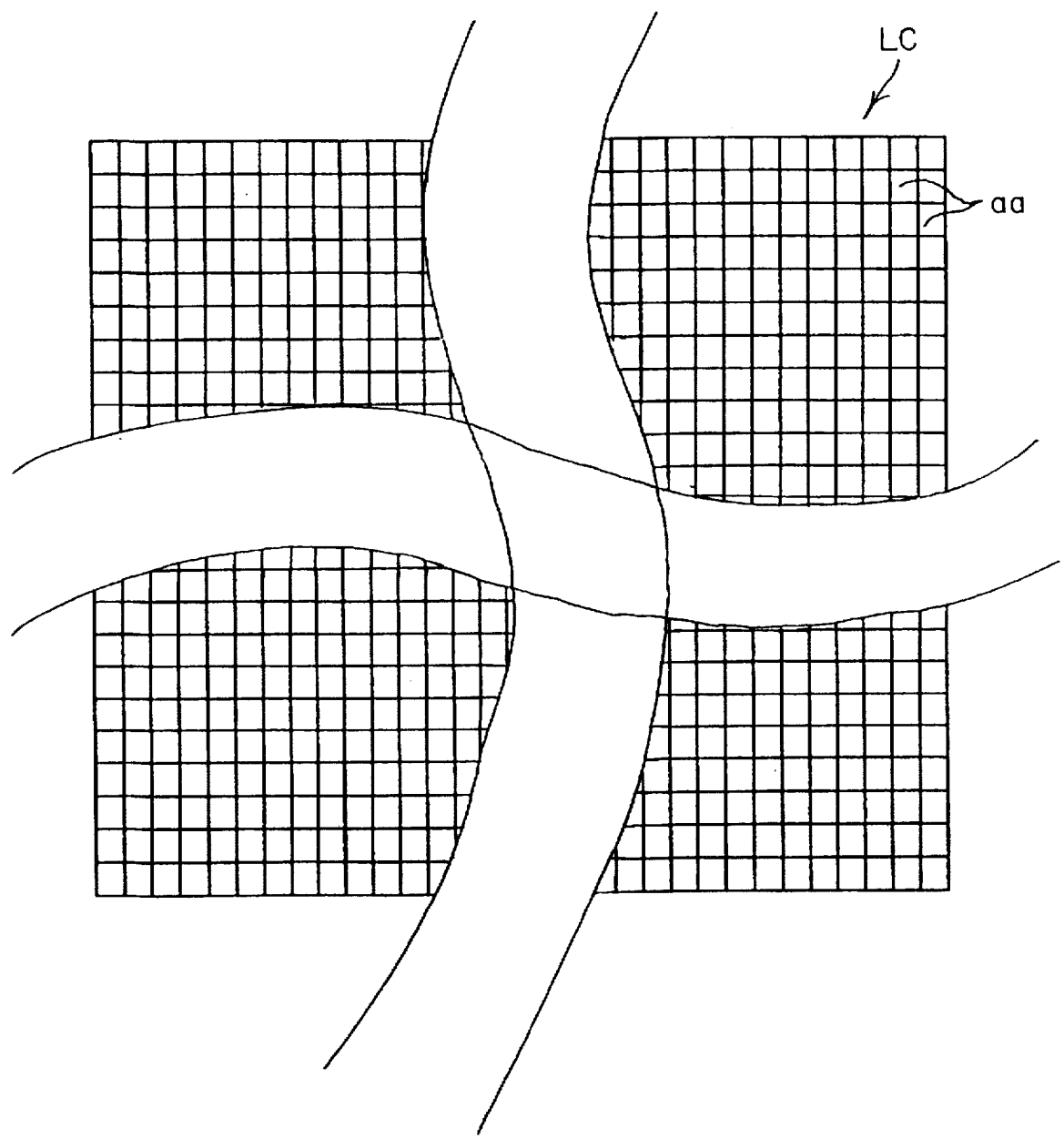

The light transmitting through the compound prism 20 passes through the LC matrix (LC), and is incident upon a movable portion 15. The LC matrix includes a large number of LC elements (micro units) arranged in a dot matrix, each capable of controlling the phase of the incident light. In the illustrated embodiment, the matrix is a square matrix consisting of (32×32) LC elements. FIG. 7 schematically shows a plan view of the LC matrix consisting of LC elements (pixels) aa in a matrix arrangement, by way of example.

The LC matrix is controlled by an LC controller (control circuit) 50 in an open-loop. The LC controller 50 independently controls the voltage applied to the LC elements aa, in accordance with control data stored in a memory 51, to control the refractive index of each LC element aa of the LC matrix; as would be understood by one of ordinary skill in the art, LC controller 50 includes the necessary control hardware/logic to control the voltage applied to LC elements aa in accordance with the control data. The control data includes addresses of the LC elements and voltage values to be applied to the LC elements in combination. In the first embodiment, the memory 51 stores one set of control data for the LC elements of a specific LC matrix (LC) to correct inherent aberrations of the optical system.

Since the refractive index of a liquid crystal varies depending on the voltage applied thereto, the refractive index distribution in a section perpendicular to the direction of the travel of the light can be optionally selected by independently controlling the voltage applied to the LC elements of the LC matrix, thereby controlling the phase of the wavefront of the light transmitted through the LC elements.

In the illustrated embodiment, the LC matrix, the LC controller 50, and the memory 51 constitute a wavefront aberration compensating apparatus.

The movable portion 15 includes (1) a reflecting mirror 16 which reflects the laser light, emitted parallel with the surface of the magneto-optic disc from the compound prism 20, into a direction perpendicular to the surface of the magneto-optic disc, and (2) an objective lens 17 which converges the light reflected by the reflecting mirror 16 onto the recording surface 1a of the magneto-optic disc 1. The movable portion 15 is moved on and along a guide rail 40 in the radial direction R of the disc 1 to have access to an optional (adjacent) track of the magneto-optic disc 1.

The light reflected by the magneto-optic disc 1 is incident upon the compound prism 20 through the objective lens 17, the reflecting mirror 16 and the LC matrix (LC). The light reflected by the first half mirror surface 20a is transmitted through a ½ wave plate 25 which rotates the direction of polarization by 45°. The light is then split by a polarization beam splitter 26 into a P-polarized light component and an S-polarized light component. The P-polarized light and the S-polarized light are received by first and second light receiving elements 29 and 30, through condenser lenses 27 and 28, respectively. The first and second light receiving elements 29 and 30 detect data signals.

The light transmitted through the first half mirror surface 20a and reflected by the second half mirror surface 20b is condensed by a condenser lens 31 and a cylindrical lens 32. The light is then converged onto and received by a third light receiving element 33 for detecting an error signal. Note that the light incident upon the light receiving element 33 has an astigmatism. The data magnetically recorded on the magneto-optic disc 1 is detected in accordance with a difference in the output between the first and second light receiving elements 29 and 30. The third light receiving element 33 is a multiple-split sensor, per se known, which outputs a tracking error signal by a push-pull method, and a focusing error signal by an astigmatism correction method.

Figure 2:
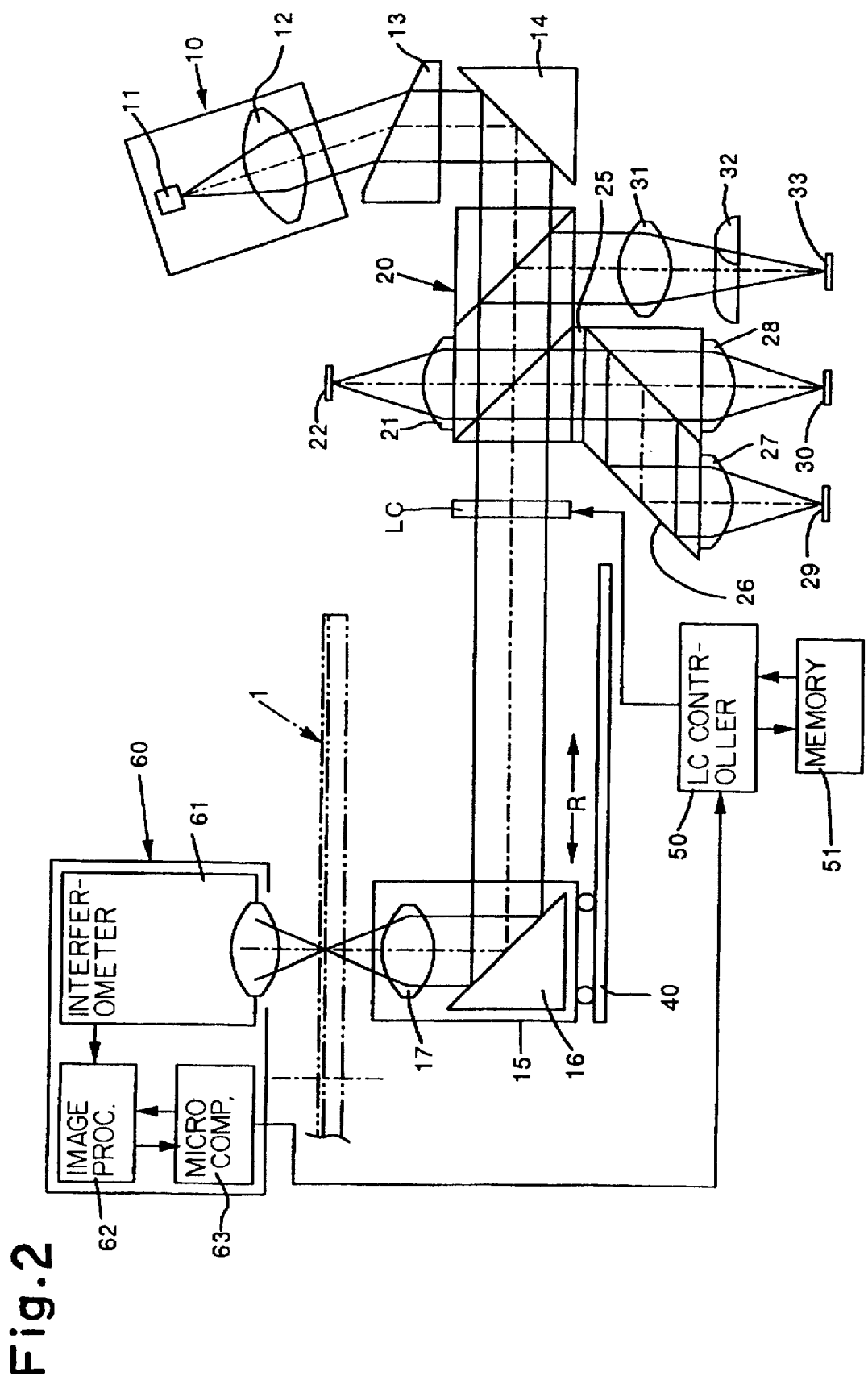
FIG. 2 is an explanatory view of the optical system shown in FIG. 1, to which an external measuring apparatus is attached.

When the wavefront aberration of a beam spot on the recording surface 1a of the magneto-optic disc 1 is measured, an external measuring apparatus 60 is attached to the magneto-optic disc apparatus, as shown in FIG. 2. The measuring apparatus 60 includes (1) an interferometer 61 which is opposed to the objective lens 17 with respect to a position (plane) where the magneto-optic disc 1 is placed, (2) an image processor 62 which processes the image signals of interference fringes output from the interferometer 61, (3) and a microcomputer 63 which calculates the value of the wavefront aberration in accordance with the processed image signals.

The control data for the LC elements of a specific LC matrix (LC) stored in the memory 51 can be calculated in accordance with the wavefront aberration of the beam spot formed on the recording surface of the magneto-optic disc 1, measured by the external measuring apparatus 60, i.e., the measurement of the wavefront aberration of the convergent light emitted from the objective lens 17. Alternatively, it is also possible to inductively obtain the control data, wherein the measurements and the modification of the control data are carried out repeatedly out to obtain an optimal measurement which represents the control data.

To calculate the control data, the wavefront aberration is measured, and the amount of correction of the phase distribution necessary to correct the wavefront aberration thus measured is determined. Consequently, the amount of correction of the refractive index of each LC element aa is calculated by the microcomputer 63 in accordance with the amount of correction of the phase distribution. Thus, the voltage applied to each LC element necessary to obtain the calculated amount of correction of the refractive index is calculated by the microcomputer 63. The data (the amount of correction of refractive index and the voltage) for each LC element thus obtained is transferred to the LC controller 50 as one set of data for the specific LC matrix (LC). The LC controller 50 stores the control data in the memory 51.

To obtain the control data inductively, the wavefront aberration is measured and the microcomputer 63 controls the LC controller 50 which modifies the voltage to be applied to the LC elements so as to minimize the wavefront aberration. When the wavefront aberration falls below a predetermined reference value, the control data is then stored in the memory 51.

The measurement of the wavefront aberration using the external measuring apparatus 60 is performed either for each of the individual magneto-optic disc apparatuses in manufacture or for a representative magneto-optic disc apparatus sampled from each lot. The control data to correct the wavefront aberration is stored in the memory 51. In the use of the magneto-optic disc apparatus, the LC controller 50 controls the LC matrix in accordance with the control data stored in the memory 51 to modulate the phase of the light, correcting the wavefront aberration of the beam spot produced on the magneto-optic disc 1 by inherent factors or characteristics of the associated optical system.

Second Embodiment

Figure 3:
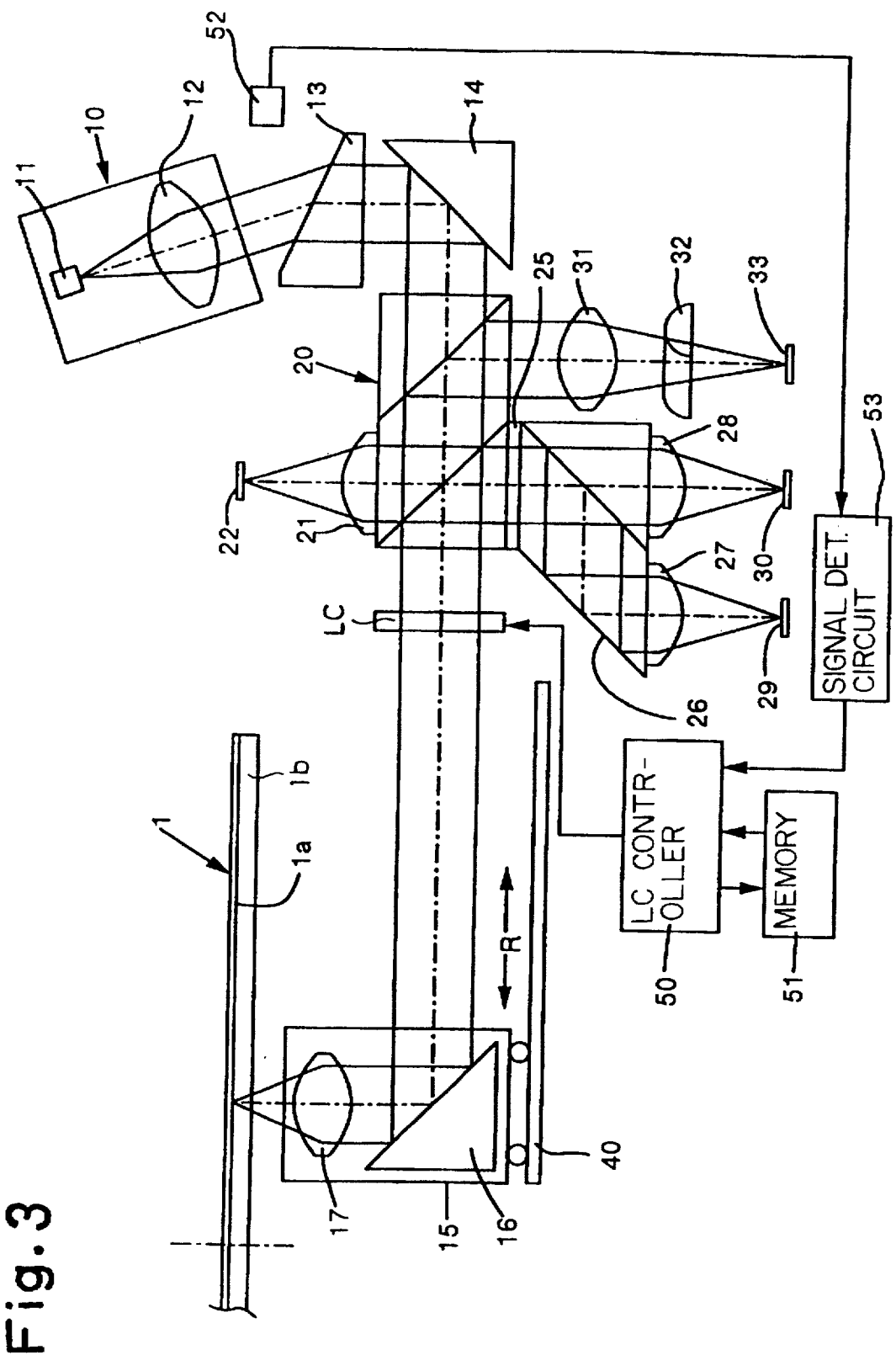
FIG. 3 is an explanatory view of an optical system of a magneto-optic disc apparatus having a wavefront aberration compensating apparatus incorporated therein, according to a second embodiment of the present invention.

FIG. 3 shows a second embodiment of a magneto-optic disc apparatus having a wavefront aberration compensating apparatus incorporated therein. The structure of the optical system in the second embodiment is the same as that of the first embodiment illustrated in FIG. 1. In the second embodiment, the LC matrix (LC) is controlled to correct the dynamic wavefront aberration produced by a change in the conditions (factor) in which the magneto-optic disc apparatus is used. Note that the control data is pre-stored in the memory 51 in accordance with the calibration (calculation) in manufacture, and the LC controller 50 controls the LC matrix in an open-loop, similar to the first embodiment.

The factor which varies in use is, for example, temperature. If the temperature changes, the distance between the semiconductor laser 11 and the collimating lens 12 changes. Hence the wavefront of the light is no longer a plane wave. Consequently, an astigmatism is produced in the radial direction or tangential direction of the magneto-optic disc 1 when the light passes through the anamorphic prism 13. Also, there is a possibility that a thermal strain occurs in the optical elements, such as a lens, due to a change in the temperature, thus resulting in an astigmatism.

If astigmatism is produced in the beam spot formed on the magneto-optic disc 1, the S/N of the data signal deteriorates. If the direction of the astigmatism is not identical to the radial direction or tangential direction, crosstalk occurs in the focusing error signal detected by the astigmatism correction method when the beam spot moves across the tracks of the magneto-optic disc.

This crosstalk is due to the irregular intensity distribution caused by the diffraction when a beam spot having the astigmatism moves across the boundary between adjacent tracks of the magneto-optic disc 1. If crosstalk occurs, the focusing error signal is produced, as if the objective lens is deviated from the in-focus position. Consequently, the objective lens is moved in the optical axis direction, so that the objective lens is unstable every time the beam spot crosses the tracks of the magneto-optic disc 1.

In the second embodiment, the output of a temperature sensor 52, such as a thermistor, is detected by a signal detecting circuit 53. The temperature data is supplied to the LC controller 50. The LC controller 50 reads the control data corresponding to the temperature data, from a table stored in the memory, and controls the LC matrix in accordance with the control data. Thus, the astigmatism produced due to the change in the temperature is corrected to prevent the signals from deteriorating.

The control data can be obtained by calibration upon manufacturing of the magneto-optic disc apparatus, using the external measuring apparatus 60 (as in the first embodiment) and is stored in the memory 51. In calibrating to correct the dynamic wavefront aberration, the wavefront aberration is measured while varying the ambient temperature and a table which shows sets of control data, each data set including the temperatures and the control data of the LC elements to correct the wavefront aberration at the temperatures, is stored in the memory 51. The control data can be deductively or inductively obtained, as in the first embodiment.

In the second embodiment, the LC matrix (LC), the LC controller 50, the memory 51, the temperature sensor 52, and the signal detecting circuit 53 constitute a wavefront aberration compensating apparatus.

Another factor which varies in the use of the magneto-optic disc apparatus, is, for example, the thickness of the substrate 1b of the magneto-optic disc 1, when the magneto-optic disc is changed.

The change in the thickness of the substrate 1b of the magneto-optic disc 1 to be used is equivalent to a change in the thickness of a plane-parallel plate arranged in the optical path of the convergent light, and hence a spherical aberration is produced. This results in an offset of the focusing error signal and a deterioration of the S/N ratio of the data signals.

To this end, the wavefront aberration is measured by the external measuring apparatus 60 in the course of manufacture of the magneto-optic disc apparatus to detect the kind of magneto-optic disc used and obtain the control data of the LC matrix to correct the wavefront aberration. The control data is obtained for several magneto-optic discs which could be used and is stored in the memory 51. Upon measurement, transparent plates whose thicknesses are identical to those of the substrates 1b of the magneto-optic discs 1 stored in memory 51 are set in the position of the magneto-optic discs in place thereof.

In use, the state of a switch (not shown), which is actuated depending on the type of magneto-optic disc to be used, is detected, and the control data corresponding to the kind of magneto-optic disc is read to control the LC matrix in accordance with the control data. Thus, not only can the spherical aberration, which would be produced when the magneto-optic disc is changed, be eliminated, but also no deterioration of the data signals takes place.

Third Embodiment

Figure 4:
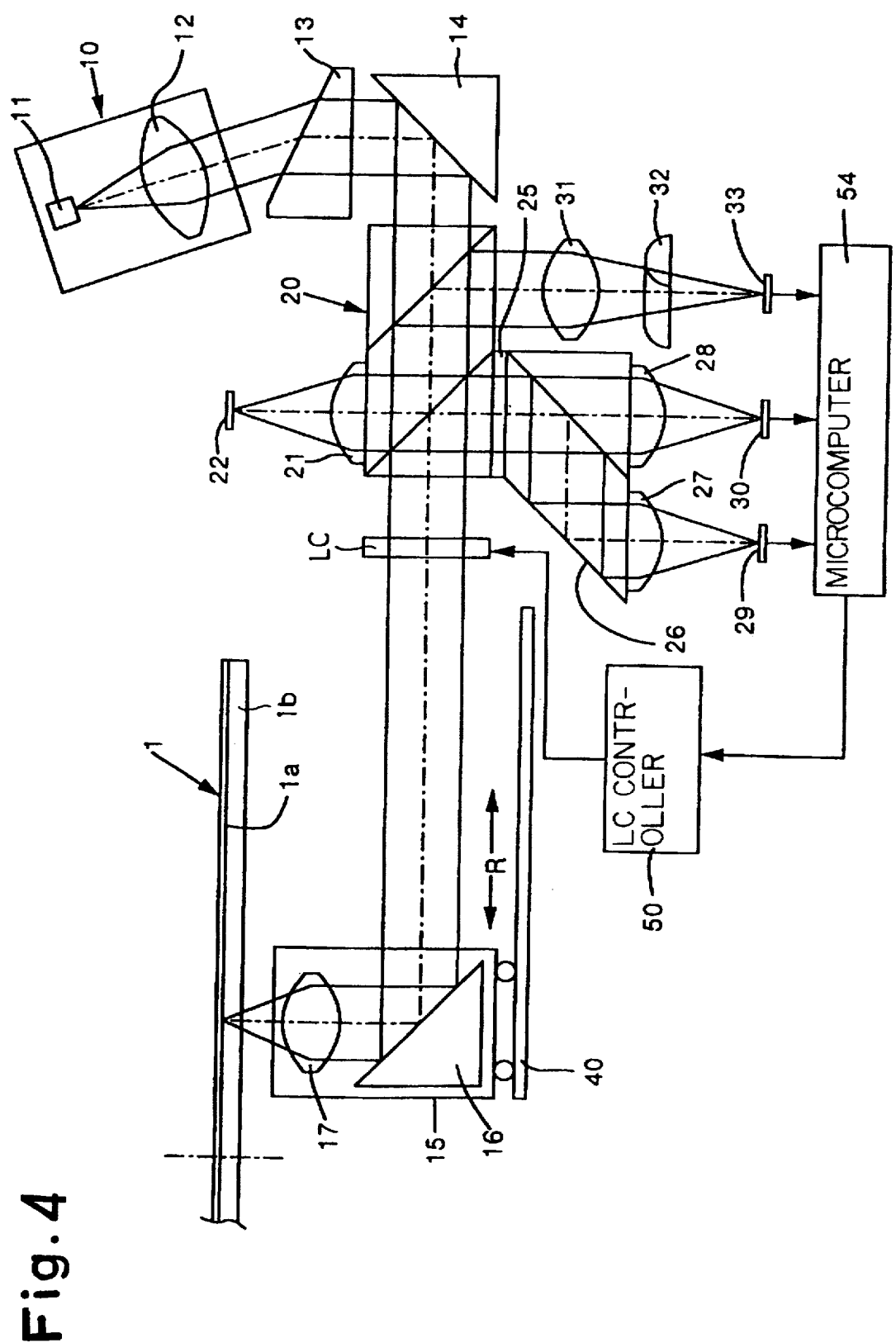
FIG. 4 is an explanatory view of an optical system of a magneto-optic disc apparatus having a wavefront aberration compensating apparatus incorporated therein, according to a third embodiment of the present invention.

FIG. 4 shows a third embodiment of a magneto-optic disc apparatus having a wavefront aberration compensating apparatus incorporated therein. The structure of the optical system is same as that of the first and second embodiments. In the third embodiment, the LC matrix is controlled to correct the dynamic wavefront aberration produced due to a change in external factors or conditions in the use of the magneto-optic disc apparatus. However, unlike the second embodiment, there is no control data in the third embodiment. The LC controller 50 controls the LC matrix (LC) in accordance with a signal detected in the use of the magneto-optic disc apparatus in a closed-loop.

Since changes in temperature or changes in the type of magneto-optic disc in use can be directly detected during use of the apparatus, a table showing the relation between temperature or the kind of magneto-optic disc with the control data can be prepared during manufacture of the apparatus. However, the deflection, deformation or inclination, for example, of the magneto-optic disc cannot be directly detected in advance when manufacturing the apparatus, and hence it is impossible to prepare the table in advance to compensate for these factors.

The deflection or inclination of the magneto-optic disc 1 is equivalent to a deflection or inclination of the substrate (plane-parallel plate) 1b which is located in the optical path of the convergent light. A comatic aberration is produced, resulting in an offset of the tracking error signal detected by the push-pull method and a deteriorated S/N ratio of the data signal.

In the third embodiment, the signals from the data signal detecting light receiving elements 29 and 30 and the error signal detecting light receiving element 33 are supplied to the microcomputer 54. The microcomputer 54 calculates voltages to be applied to the LC elements of the LC matrix to optimize the detection signals, while monitoring the output signals of the light receiving elements 29, 30 and 33. Voltages thus obtained are applied to the LC elements of the LC matrix by the LC controller 50; as would be understood by one of ordinary skill in the art, in this embodiment, LC controller 50 merely acts as a driver for the LC matrix, while the calculations are performed by microcomputer 54 under software control. In the third embodiment, the LC matrix, the LC controller 50, and the microcomputer 54 constitute a wavefront aberration compensating apparatus.

According to the third embodiment, since the LC matrix minimizes the deterioration of the detection signals of the light receiving elements, the detection signals are prevented from deteriorating. This occurs even when a factor which deteriorates the signal quality, such as deflection or inclination of the magneto-optic disc, cannot be directly detected, so long as the deterioration of the signals is caused by the wavefront aberration.

The wavefront aberration inherent to the optical system, or the wavefront aberration caused by changes in temperature or changes in the thickness of the substrate of the magneto-optic disc, as in the first or second embodiment, can be also compensated by the apparatus according to the third embodiment without any calibration. Note that the time necessary to stabilize the signals is longer in the third embodiment than in the first or second embodiment, since the state in which the signals are optimum is inductively obtained in the third embodiment.

Fourth Embodiment

Figure 5:
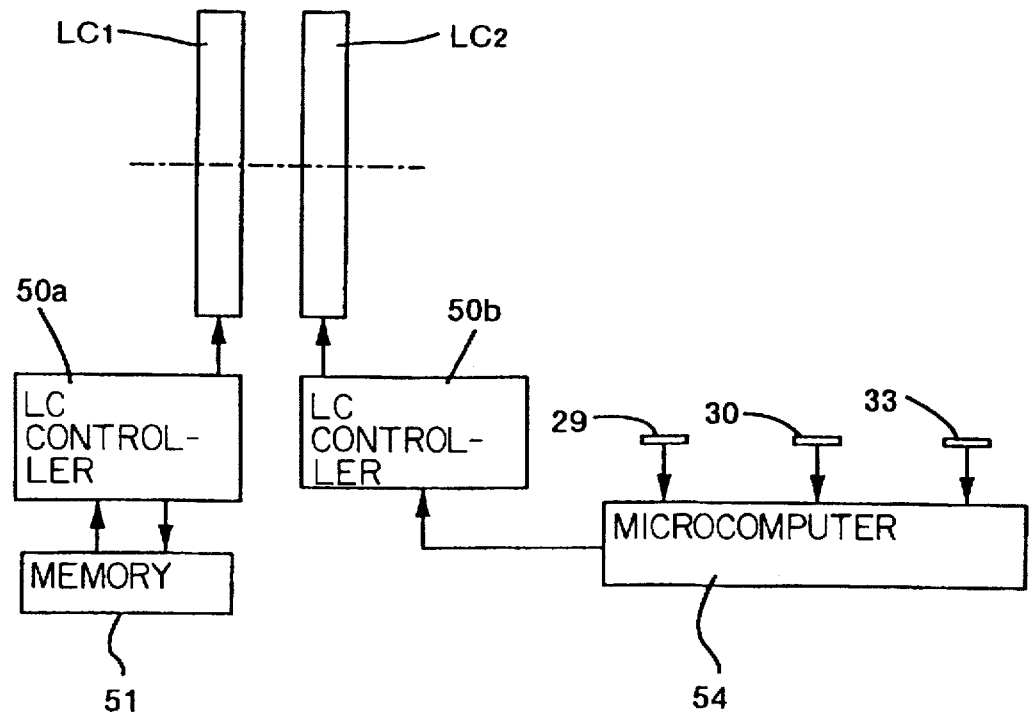
FIG. 5 is an explanatory view of a wavefront aberration compensating apparatus according to a fourth embodiment of the present invention.

FIG. 5 shows a fourth embodiment of a wavefront aberration compensating apparatus. In FIG. 5, a first LC matrix LC1 to correct the aberrations inherent in the optical system as in the first embodiment, and a second LC matrix LC2 to correct the aberrations caused by the change in the conditions or factors in the use of the apparatus as in the third embodiment, are aligned on the same optical axis. The LC matrices LC1 and LC2 are located between the compound prism 20 and the movable portion 15, as in the above-mentioned embodiments.

The first LC matrix LC1 is controlled by a first LC controller 50a in an open-loop, in accordance with the control data stored in the memory 51, to correct the static wavefront aberration inherent in the optical system. The second LC matrix LC2 is controlled by a second LC controller 50b in a closed-loop, in accordance with the signals output from the microcomputer 54 which receives the outputs of the light receiving elements 29, 30 and 33, to correct the dynamic wavefront aberration caused by changes in the factors or conditions of use, such as temperature or an inclination of the magneto-optic disc, etc.

Figure 6:
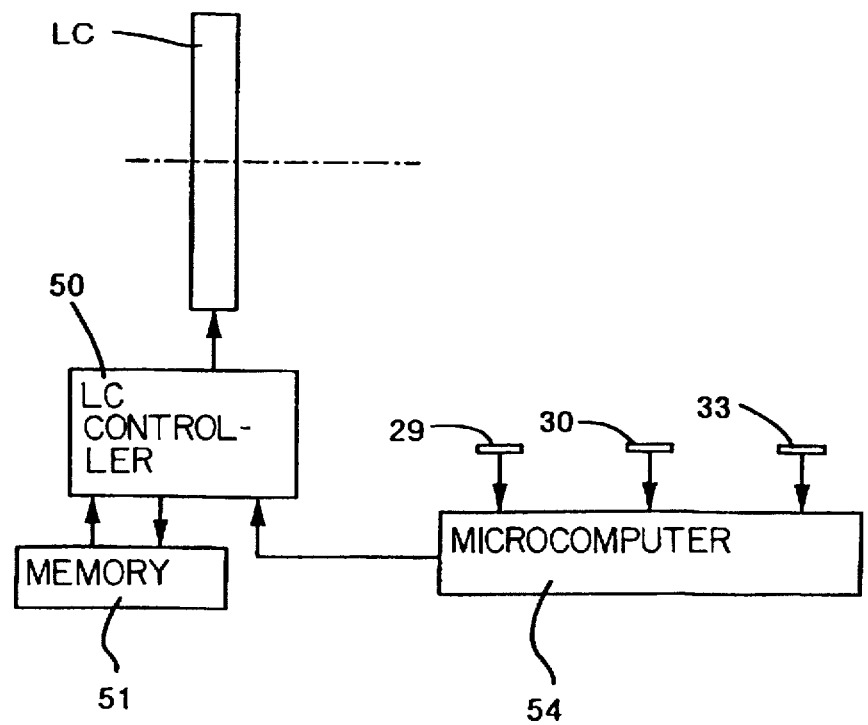
FIG. 6 is an explanatory view of a wavefront aberration compensating apparatus modified from that shown in FIG. 5; and, FIG. 7 is a schematic view of a matrix of liquid crystal elements used in the present invention.

FIG. 6 shows a modified embodiment of the fourth embodiment mentioned above. In FIG. 6, the two LC matrices LC1 and LC2 in FIG. 5 are replaced by a single LC matrix (LC). The voltage to be applied to the individual LC elements of the LC matrix is set to be a total of a first voltage to correct the wavefront aberration inherent in the optical system and a second voltage to correct the wavefront aberration caused by changes in the factors or conditions of use, respectively, if it can be considered that the refractive index of the LC matrix varies linearly in connection with the voltage. If the refractive index-voltage characteristics are not linear, the voltage to be applied to the LC elements is re-calculated to correct the resultant wavefront aberration.

In the fourth embodiment, since the LC matrix is located between the compound prism 20 and the reflecting mirror 16, the light is transmitted through the LC matrix, not only when the light is made incident thereupon, but also when the light is reflected by the magneto-optic disc toward the light receiving elements. If the wavefront aberration is produced mainly by the objective lens 17, it is possible to correct the wavefront aberration produced when the light without aberration converges onto the magneto-optic disc and transmits through the objective lens 17, before the light reaches the light receiving elements.

Note that the position of the LC matrix is not limited to the illustrated embodiments. For example, the LC matrix can be located in the optical path between the light source portion 10 and the compound prism 20. Also, the LC matrix is not limited to a transmission type, e.g., a reflection type LC matrix can be used in place of the reflection mirror 14.

As can be understood from the above discussion, according to the present invention, little or no wavefront aberration is produced on the recording medium by adjusting the phase distribution of light, using the liquid crystal elements (matrix). Consequently, the precision needed for the optical elements in manufacture and assembly can be relaxed, reducing manufacturing cost.

What is claimed is:

1. A wavefront aberration compensating apparatus for an optical data recording and reproducing apparatus to correct a wavefront aberration of light emitted from a light source and converged onto a data recording medium through an image forming optical system, said apparatus comprising:

a liquid crystal matrix including a plurality of liquid crystal elements in a two-dimensional matrix arrangement, located in an optical path between said light source and said data recording medium, each of said plurality of liquid crystal elements independently controlling a phase of light incident thereupon; and, liquid crystal control means for individually controlling each of said plurality of liquid crystal elements to minimize the wavefront aberration of a beam spot converged onto said data recording medium.

2. The wavefront aberration compensating apparatus according to claim 1, wherein said liquid crystal control means independently controls a voltage applied to, and a refractive index of, each of said plurality of liquid crystal elements.

3. The wavefront aberration compensating apparatus according to claim 2, further comprising an optical detector which detects the light reflected from said recording medium, wherein said liquid crystal control means controls a voltage to be applied to said plurality of liquid crystal elements to minimize deterioration in said signals detected by said optical detector.

4. The wavefront aberration compensating apparatus according to claim 1, further comprising storage means in which predetermined control data is stored, wherein said liquid crystal control means controls said plurality of liquid crystal elements in accordance with said control data stored in said storage means.

5. The wavefront aberration compensating apparatus according to claim 4, wherein said storage means stores a plurality of sets of data for said plurality of liquid crystal elements, including data representing at least one factor which varies during use of said apparatus, and control data to correct wavefront aberration due to changes in said at least one factor, and wherein said liquid crystal control means reads, from said storage means, data corresponding to a state of said factor detected during the use of said apparatus, and controls said plurality of liquid crystal elements in accordance with said control data.

6. The wavefront aberration compensating apparatus according to claim 4, wherein said storage means stores a plurality of sets of data for said plurality of liquid crystal elements including data for a plurality of different recording mediums to be used, and control data to correct the wavefront aberration produced by said plurality of different recording mediums, and wherein said liquid crystal control means reads, from said storage means, data corresponding to a recording medium detected in use in the apparatus, and controls said plurality of liquid crystal elements in accordance with said control data.

7. The wavefront aberration compensating apparatus according to claim 4, wherein said storage means stores a plurality of sets of control data for said plurality of liquid crystal elements including data to correct a wavefront aberration due to a change in temperature, and wherein said liquid crystal control means reads, from said storage means, data corresponding to a temperature detected in the use of said apparatus, and controls said plurality of liquid crystal elements in accordance with said data.

8. The wavefront aberration compensating apparatus according to claim 4, wherein said storage means stores a set of control data for said plurality of liquid crystal elements to correct wavefront aberration inherent in said image forming optical system.

9. The wavefront aberration compensating apparatus according to claim 4, in combination with an external measuring apparatus for providing control data to the wavefront aberration compensating apparatus, said external measuring apparatus comprising:

an interferometer which receives light emitted from said image forming optical system and measures a wavefront aberration of a beam spot formed on said recording medium; and, means for obtaining control data to control said plurality of liquid crystal elements in accordance with wavefront aberration data measured by said interferometer, and outputting control data thus obtained to said storage means.

10. The wavefront aberration compensating apparatus according to claim 1, further comprising a microprocessor which outputs control data, wherein said liquid crystal control means controls said plurality of liquid crystal elements in accordance with said control data.

11. The wavefront aberration compensating apparatus according to claim 10, wherein a signal representative of light reflected from said recording medium is input to said microprocessor, and said microprocessor determines said control data to minimize deterioration in said signal.

12. A wavefront aberration compensating apparatus for an optical data recording and reproducing apparatus to correct a wavefront aberration of light emitted from a light source and converged onto a data recording medium through an image forming optical system, said apparatus comprising:

a liquid crystal matrix including a plurality of liquid crystal elements in a two-dimensional matrix arrangement, located in an optical path between said light source and said data recording medium, each of said plurality of liquid crystal elements independently controlling a phase of light incident thereupon;

a controller which generates control signals to control each of said plurality of liquid crystal elements to minimize wavefront aberration of a beam spot converged onto said data recording medium;

a driver which drives said liquid crystal matrix based on said control signals; and a memory for storing data to be used by said controller to generate said control signals.

13. The wavefront aberration compensating apparatus according to claim 12, further comprising an LC controller unit which includes said controller and said driver.

14. The wavefront aberration compensating apparatus according to claim 12, further comprising a microcomputer which includes said controller and said memory.

15. A wavefront aberration compensating method for an optical data recording and reproducing apparatus, said apparatus including a light source, a data recording medium, an image forming optical system for converging light emitted from said light source onto said data recording medium, a liquid crystal matrix including a plurality of liquid crystal elements in a two-dimensional matrix arrangement and located in an optical path between said light source and said data recording medium, each said plurality of liquid crystal element independently controlling a phase of light incident thereupon and, a liquid crystal control means for individually controlling said plurality of liquid crystal elements to minimize a wavefront aberration of a beam spot converged onto said data recording medium said method comprising the steps of:

positioning an interferometer to receive light emitted from said image forming optical system at a position where said recording medium is to be placed;

measuring a wavefront aberration of light to be converged onto said recording medium by said interferometer;

obtaining control data to control said plurality of liquid crystal elements in accordance with said wavefront aberration data measured by said interferometer; and controlling said plurality of liquid crystal elements by said control data to minimize said wavefront aberration of the beam spot converged onto said recording medium.

16. The wavefront aberration compensating method according to claim 15, further comprising:

storing said control data in a memory; and reading said control data from said memory.

17. The wavefront aberration compensating method according to claim 15, wherein said controlling step independently controls a voltage applied to each of said plurality of liquid crystal elements to control the refractive index of each said plurality of liquid crystal element.

18. An optical data recording and reproducing apparatus, comprising:

a light source;

an image forming optical system which converges light emitted from said light source onto a data recording medium;

signal detecting means for detecting light reflected by said data recording medium to pick up signals therefrom;

a liquid crystal matrix including a plurality of liquid crystal elements arranged in a two-dimensional matrix and located in an optical path between said light source and said data recording medium, each of said liquid crystal elements independently controlling a phase of light incident thereupon; and, a liquid crystal control means for individually controlling said plurality of liquid crystal elements to minimize a wavefront aberration of a beam spot converged onto said data recording medium.

19. The optical data recording and reproducing apparatus according to claim 18, wherein said liquid crystal control means controls said plurality of liquid crystal elements in accordance with output from said signal detecting means.

20. The wavefront aberration compensating apparatus according to claim 18, further comprising a microprocessor which outputs control data, wherein said liquid crystal control means controls said plurality of liquid crystal elements in accordance with said control data.

21. The wavefront aberration compensating apparatus according to claim 20, wherein an output of said signal detecting means is input to said microprocessor, and said microprocessor determines said control data to minimize wavefront aberration of said beam spot converged onto said data recording medium.

22. The optical data recording and reproducing apparatus according to claim 18, further comprising storage means for storing predetermined control data to correct wavefront aberration, wherein said liquid crystal control means controls said plurality of liquid crystal elements in accordance with said predetermined control data.

23. The optical data recording and reproducing apparatus according to claim 22, wherein said storage means stores a set of control data to correct wavefront aberration inherent to said image forming optical system.

24. The optical data recording and reproducing apparatus according to claim 22, wherein said storage means stores a plurality of sets of data for said plurality of liquid crystal elements, including data representing at least one factor which varies with use of said apparatus, and control data to correct wavefront aberration due to a change in said at least one factor, and wherein said liquid crystal control means reads control data from said storage means corresponding to a state of said at least one factor detected during use of said apparatus and controls said plurality of liquid crystal elements in accordance with said control data.

* * * * *